United States Patent [19]

Foschi et al.

[11] 4,152,500

[45] May 1, 1979

[54] SUSPENSION POLYMERIZATION OF VINYL CHLORIDE WITH POLYVINYLALCOHOL (SAPONIFICATION NO. 300-500)

[75] Inventors: Claudio Foschi, Forli'; Ferruccio Fronzoni, Ravenna; Corrado Mora, San Donato Milanese, all of Italy

[73] Assignee: Anic S.p.A., Italy

[21] Appl. No.: 837,010

[22] Filed: Sep. 27, 1977

Related U.S. Application Data

[63] Continuation of Ser. No. 639,630, Dec. 10, 1975, abandoned.

[30] Foreign Application Priority Data

Dec. 10, 1974 [IT] Italy .................................. 30336 A/74

[51] Int. Cl.² ........................... C08F 2/20; C08F 14/06
[52] U.S. Cl. .......................................... 526/74; 526/3; 526/200; 526/202; 526/344.2

[58] Field of Search ...................... 526/200, 202, 3, 74

[56] References Cited

U.S. PATENT DOCUMENTS

| 3,817,959 | 6/1974 | Balwé | 526/200 |
| 3,862,066 | 1/1975 | Reiter | 526/202 X |

FOREIGN PATENT DOCUMENTS

| 991134 | 5/1965 | United Kingdom | 526/200 |
| 1150488 | 4/1969 | United Kingdom | 526/200 |

*Primary Examiner*—C. A. Henderson
*Attorney, Agent, or Firm*—Morgan, Finnegan, Pine, Foley & Lee

[57] ABSTRACT

A process is disclosed for the suspension polymerization of vinyl chloride in which during the polymerization an agent is added preventing the forming of incrustations on the walls of the reactor.

4 Claims, No Drawings

SUSPENSION POLYMERIZATION OF VINYL CHLORIDE WITH POLYVINYLALCOHOL (SAPONIFICATION NO. 300-500)

CROSS-REFERENCE TO RELATED APPLICATION

This is a continuation of U.S. Pat. application Ser. No. 639,630, filed Dec. 10, 1975, now abandoned.

BACKGROUND OF THE INVENTION

1. Field of the Invention

The present invention relates to a process for the suspension polymerization of vinyl chloride, either alone or in admixture with other monomers.

2. Description of the Prior Art

It is known that, in the suspension polymerization of vinyl chloride, either alone or in admixture with other monomers, remarkable amounts of polymer accumulate onto the walls of the autoclave. The importance of such a deposit is normally depending on the type of stirring, on the formulations which are used (type and amount of suspending agents and of catalysts), on the impurities present in the monomers and on the number of polymerization runs carried out.

Such a deposit reduces the heat transmission through the walls of the autoclave and gives place to difficulties in controlling the reaction; moreover the product is highly contaminated by hard and vitreous crystals. As a rule the scales are removed, after each polymerization run, either manually and with high pressure water, which is anyhow requiring one hour or longer times; moreover, in the case of manual operation, problems of environment hygiene arise for the personnel attending to the descaling operation. The Italian Pat. No. 874,456 in the name of B. F. Goodrich Co., relates to a process for the suspension polymerization of vinyl chloride, according to which the aforementioned drawbacks are mitigated due to the addition, during the reaction, of magnesium hydroxide, at the maximum proportion of 1000 ppm referred to the monomers.

Thus, an essential reduction of the incrustations is obtained, as well as a simultaneous worsening of the porosity and of the heat stability of the polymer: the addition of magnesium hydroxide in an amount higher than 1000 ppm causes an intolerable deterioration of the product.

SUMMARY OF THE INVENTION

Now it has been found, and constitutes the subject matter of the present invention, that the suspension polymerization of vinyl chloride, either alone or in admixture with other monomers, is possible without undergoing any deposit of incrustations onto the walls of the autoclave, and without worsening of the polymer properties, by adding, during the polymerization, a mixture of polyvinyl alcohols having an average saponification number of between 300 and 500 together with a natural substance like clay or bentonite or a hydroxyl compound with colloidal behaviour of an element of the Groups IIA, IIB, IIIA, IVA, VIII of the Periodic Table and, only in the latter case and at the end of the polymerization, a strong inorganic acid or an hydrolysable salt thereof.

The polymers of vinyl chloride, produced according to the present invention, are granular homopolymers of vinyl chloride or copolymers of vinyl chloride containing about 80% or more of vinyl chloride or about 20% or less of vinylidene compounds including a terminal group $CH_2=C<$. These vinylidene compounds comprise, for example, any compound amongst those known to those skilled in the art as being copolymerizable with vinyl chloride, including, without being limited thereto, different vinyl halides; vinylidene chloride; vinyl esters such as vinyl acetate or vinyl butyrate; esters of the acrylic or methacrylic acid, such as methyl-acrylate, butyl-acrylates, isooctyl-acrylate, methyl-methacrylate or hexyl-methacrylate; maleic or fumaric esters, such as diethyl-maleate or dipropyl-fumarate; aromatic vinyl monomers, such as styrene, mono-olefins, including ethylene, propylene or butylene; vinyl ethers, such as vinyl-ethyl ether; allyl esters, such as allyl acetate, diallyl phthalate; acrylonitrile or methacrylonitrile; or the like.

The polymerization reaction is normally carried out under pressure in the presence of a catalyst soluble in the monomer (oil) at temperatures lower than about 100° C.

Suitable oil soluble catalysts comprise, for example, lauryl peroxide, peroxydicarbonates, inclusive of diisopropylperoxydicarbonate, caprylil peroxide, azodiisobutyronitrile or the like, normally at temperatures in the range of about 40 to 60° C. The amount used is normally maintained as little as possible consistently with a good polymerization velocity; less than 1 part, such as 0.2 parts of lauryl peroxide or 0.02 part of diisopropyl-peroxy-dicarbonate. The catalyst can be used as it is or directly prepared in the polymerization autoclave. The suspending agents used comprise any one amongst the well known materials useful for such a purpose, including gelatin, polyvinyl alcohol with a low saponification number, water soluble cellulose ethers, such as methylcellulose and the like. The amount of polyvinyl alcohol having saponification number of between 300 and 500 varies from 0.01 to 0.5% by weight with respect to the weight of the monomer, whereas the amount of the natural substance or hydroxylated compound varies between 0.1 and 0.5% by weight with respect to the monomer or monomers fed.

DESCRIPTION OF THE PREFERRED EMBODIMENTS

Every operative condition shall be more evident upon examining the following examples, having the only purpose of better clarifying the invention, without, however, limiting the scope thereof.

EXAMPLE 1

A 25 cu.m. reactor, provided with a stirrer and a Pfaudler wavebreaker, was charged with the following mixture, referred to 100 parts of vinyl chloride (VCM):

VCM: 100
$H_2O$: 150
methylcellulose: 0.035
$NaHCO_3$: 0.02
tert-butylcyclohexyl peroxydicarbonate: 0.03

The stirrer was rotated at a speed of 120 RPM and the reaction temperature was 55° C. After 9 hours it was no longer possible to control the reaction, whereby the residual monomer was removed by distillation and a conversion of about 70% was found. The incrustations, manually removed, were about 8 kg. The density of the product was 490 g/lt.

EXAMPLE 2

The reaction mixture of the Example 1 was supplemented with 0.06 parts of $Mg(OH)_2$. 5 runs were carried out before the cleaning operation, 10 kg of incrustations being then removed. The conversion rate, which was higher for the initial batches and gradually decreasing, was on the average about 78%.

EXAMPLE 3

With respect to the Example 2 the amount of $Mg(OH)_2$ was increased to 0.2 parts. After 15 batches, 11 kg of scale were removed.

The average conversion was about 87%. In this series of runs too, the conversion rate decreased as the deposits on the walls were increasing. The average density also (530 g/lt) resulted higher than that obtained in the Example 1. The thermal stability was constantly worse and unacceptable.

A sample of this series of runs, treated with 0.02 parts of $(NH_4)_2SO_4$ and washed, gave a normal heat stability. Such a treatment was always used in the subsequent Examples with $Mg(OH)_2$.

EXAMPLE 4

The Example 3 was repeated, except that 0.07 parts of polyvinyl alcohol having saponification number of 420 were added. After 50 batches without cleaning, the walls appeared completely free from incrustations. The conversion was 93% in all the batches and the density was 480 g/lt. Such a formulation, treated in a reactor having small size and a variable stirring speed, gave the same results.

Of course it was necessary in this case to adequate the proportion of the primary suspending agents, so as to obtain the desired morphologic characteristics.

EXAMPLE 5

As the Example 4 by substituting for the $Mg(OH)_2$ 0.05 parts of a commercial bentonite (Ultragel 300). After 30 batches, 5 kg of incrustations were removed.

The average conversion was 92% and the density 460 g/lt. The heat stability was optimal even without the post-treatment with $(NH_4)_2SO_4$.

We claim:

1. In process for the suspension polymerization of vinyl chloride, either alone or in admixture with other monomers, the improvement which comprises including in the mixture to be polymerized (i) from 0.01 to 0.5% by weight based on the monomers of polyvinyl alcohols having an average saponification number of between 300 and 500 and (ii) from 0.1 to 0.5% by weight based on the monomers of bentonite, whereby polymer build-up on polymer reactor walls is substantially reduced or eliminated.

2. The process of claim 1 wherein the polyvinyl alcohol has an average saponification number of about 420.

3. In a process for the suspension polymerization of vinyl chloride, the improvement which comprises including in the mixture to be polymerized (i) from 0.01 to 0.5% by weight based on the vinyl chloride of polyvinyl alcohols having an average saponification number of between about 300 and 500 and (ii) from 0.1 to 0.5% by weight based on the vinyl chloride of $Mg(OH)_2$, and adding at the end of the polymerization 0.02% by weight based on the vinyl chloride of $(NH_4)_2SO_4$, whereby polymer build-up on polymer walls is substantially reduced or eliminated.

4. The process of claim 3 wherein the polyvinyl alcohol has an average saponification number of about 420.

* * * * *